UNITED STATES PATENT OFFICE.

MICHAEL W. FRY, OF GUYANDOTTE, WEST VIRGINIA.

IMPROVEMENT IN REMOVING ACIDS FROM LEATHER.

Specification forming part of Letters Patent No. 144,328, dated November 4, 1873; application filed August 20, 1873.

*To all whom it may concern:*

Be it known that I, MICHAEL W. FRY, of Guyandotte, Cabell county, State of West Virginia, have invented a new and Improved Process of Removing Acids from Tanned Hides; and I do declare that the following is a full, clear, and exact description of the same.

The invention relates to method of neutralizing the acids which remain in hides after they have been tanned, and which are calculated greatly to damage the leather.

The invention will first be fully described in connection with all that is necessary to a full understanding thereof, and then clearly pointed out in the claim.

I take three pounds of bicarbonate of soda and one of common salt, dissolving and mixing them thoroughly in about forty (40) gallons of, preferably, soft water; immerse therein one or more hides, and continue the immersion as long as any bubbles rise to the surface of the liquid.

By practical and repeated experiment I have found this steep for the previously-tanned hides eminently successful in eliminating all the adhering acid; and that, too, whether the ordinary tannic acid from bark, or that prepared in any other way from any other material, is employed.

Having thus described my invention, what I claim as new, and desire to secure by Letters Patent, is—

The process of removing acid from previously-tanned hides by immersing them in a solution of salt and bicarbonate of soda, in the manner described.

MICHAEL W. FRY.

Witnesses:
WAYNE MCMAHON,
J. B. HITE.